United States Patent
Mimura et al.

(10) Patent No.: US 11,981,255 B2
(45) Date of Patent: May 14, 2024

(54) VEHICLE CONTROL DEVICE, VEHICLE, OPERATION METHOD FOR VEHICLE CONTROL DEVICE, AND STORAGE MEDIUM

(71) Applicant: HONDA MOTOR CO., LTD., Tokyo (JP)

(72) Inventors: Yoshitaka Mimura, Wako (JP); Tsuyoshi Nojiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 17/675,510

(22) Filed: Feb. 18, 2022

(65) Prior Publication Data

US 2022/0309924 A1    Sep. 29, 2022

(30) Foreign Application Priority Data

Mar. 25, 2021   (JP) .................... 2021-052004

(51) Int. Cl.
*B60Q 1/50*   (2006.01)
*B60Q 5/00*   (2006.01)
*G08G 1/16*   (2006.01)

(52) U.S. Cl.
CPC ............. *B60Q 1/525* (2013.01); *B60Q 5/006* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 6,195,001 B1* | 2/2001 | Haddad | B60Q 1/34 340/475 |
| 9,805,604 B2* | 10/2017 | Mizuguchi | G08G 1/096758 |
| 2003/0231108 A1* | 12/2003 | Welch | B60Q 1/442 340/463 |
| 2008/0133136 A1* | 6/2008 | Breed | G08G 1/165 340/901 |

(Continued)

FOREIGN PATENT DOCUMENTS

| | | |
|---|---|---|
| JP | 2008-305151 A | 12/2008 |
| JP | 2011-164760 A | 8/2011 |

(Continued)

OTHER PUBLICATIONS

Japanese Office Action for Japanese Patent Application No. 2021-052004 mailed on Aug. 19, 2022.

*Primary Examiner* — Muhammad Adnan
(74) *Attorney, Agent, or Firm* — Thomas| Horstemeyer, LLP

(57) ABSTRACT

A vehicle control device configured to control a self-vehicle, the vehicle control device comprising: a first detection unit configured to detect a direction change of an oncoming vehicle; a second detection unit configured to detect another vehicle on a diagonally rear side of the self-vehicle; and a control unit configured to control a notification unit on the basis of detection results of the first detection unit and the second detection unit, wherein the control unit controls the notification unit to notify the other vehicle of the direction change of the oncoming vehicle in a case where the direction change of the oncoming vehicle has been detected and the other vehicle has been detected.

16 Claims, 8 Drawing Sheets

(56) References Cited

U.S. PATENT DOCUMENTS

| | | | |
|---|---|---|---|
| 2008/0162027 A1* | 7/2008 | Murphy | B60W 50/14 |
| | | | 701/1 |
| 2012/0105959 A1* | 5/2012 | Allen | G02B 5/124 |
| | | | 359/528 |
| 2014/0368324 A1* | 12/2014 | Seifert | B60Q 1/46 |
| | | | 340/435 |
| 2015/0228195 A1* | 8/2015 | Beaurepaire | B60Q 1/547 |
| | | | 340/907 |
| 2018/0261080 A1* | 9/2018 | Suzuki | B60Q 1/547 |
| 2019/0122558 A1* | 4/2019 | Matsunaga | G05D 1/0088 |
| 2020/0012097 A1* | 1/2020 | Kubota | G02B 27/01 |
| 2020/0164799 A1* | 5/2020 | Nowakowski | B60R 1/24 |
| 2020/0391731 A1* | 12/2020 | Cheon | B60W 30/09 |
| 2021/0370823 A1* | 12/2021 | Stein | G06V 20/588 |
| 2022/0073090 A1* | 3/2022 | Kakeshita | G06V 10/56 |
| 2022/0153187 A1* | 5/2022 | Ching | B60Q 1/525 |
| 2022/0388505 A1* | 12/2022 | Sharma Banjade | G08G 1/164 |
| 2023/0073966 A1* | 3/2023 | Caveney | B60W 50/0097 |
| 2023/0347878 A1* | 11/2023 | Wöhlte | B60W 30/0956 |
| 2023/0347885 A1* | 11/2023 | Fukui | B60W 30/18145 |

FOREIGN PATENT DOCUMENTS

| | | | |
|---|---|---|---|
| JP | 2011164760 A | * | 8/2011 |
| JP | 2011-253486 A | | 12/2011 |
| JP | 2019-125232 A | | 7/2019 |

* cited by examiner

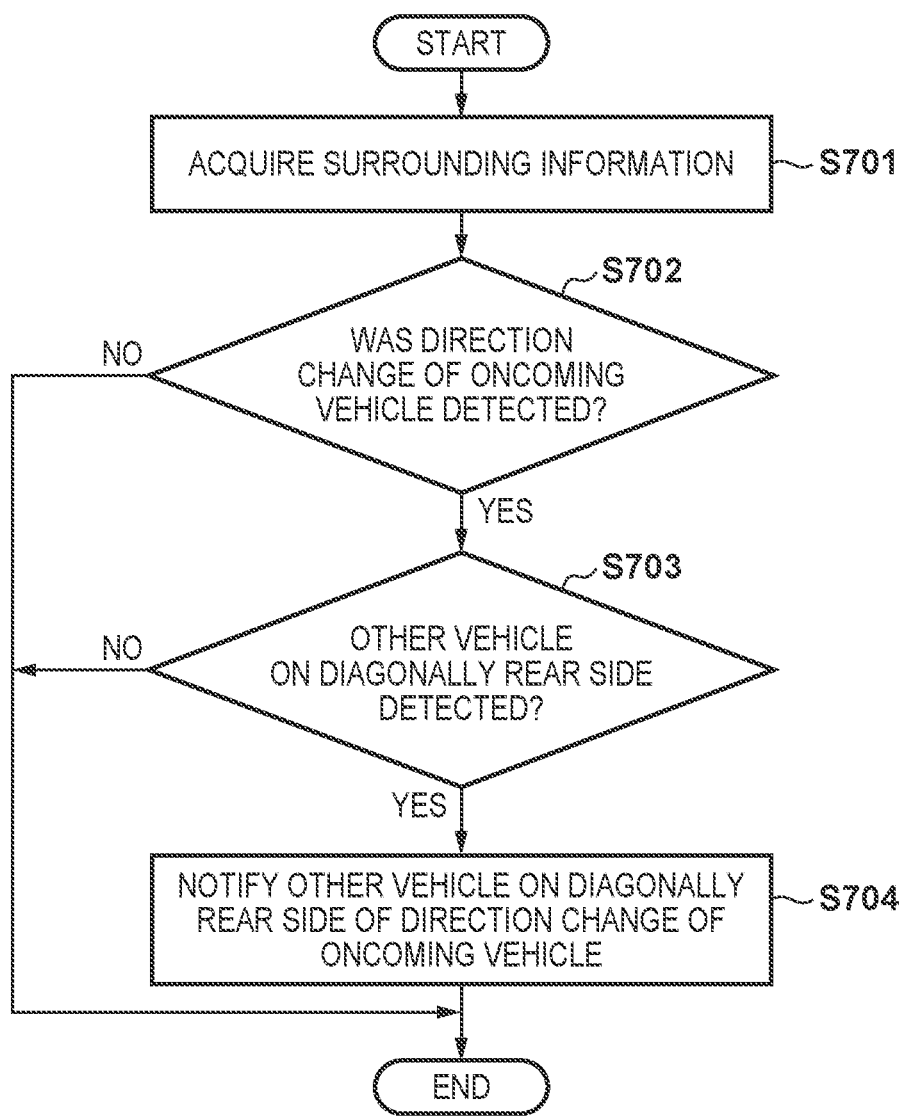

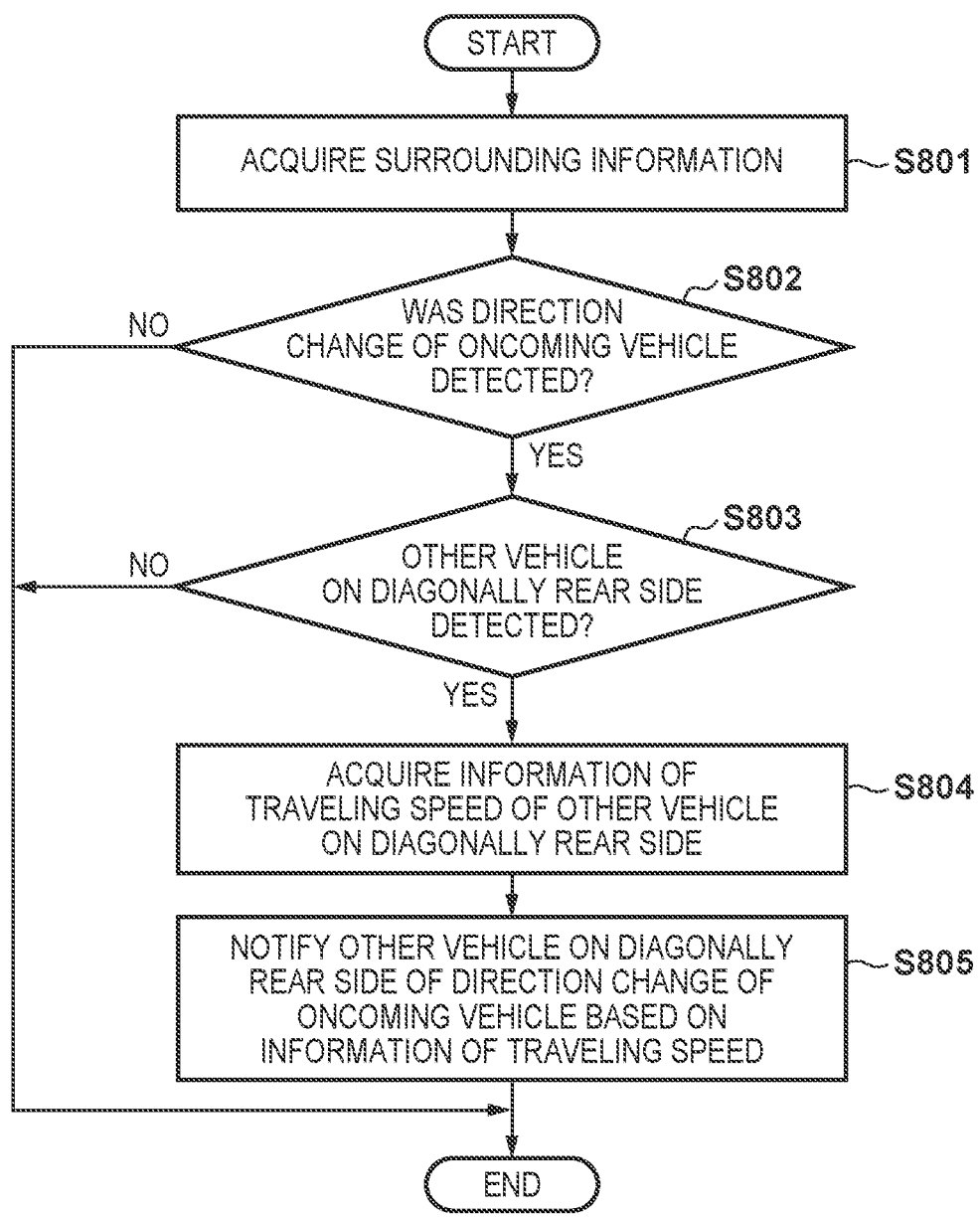

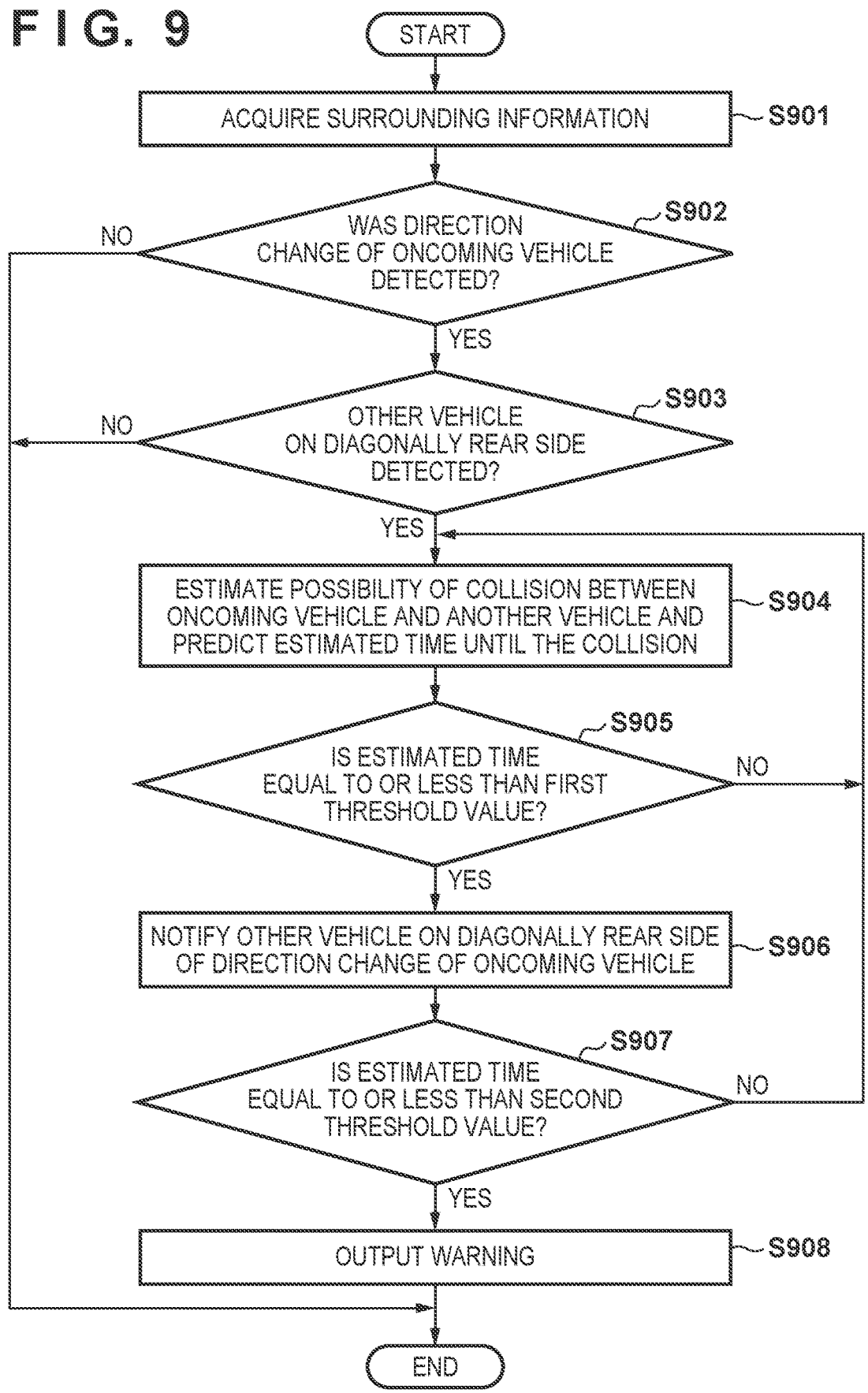

VEHICLE CONTROL DEVICE, VEHICLE, OPERATION METHOD FOR VEHICLE CONTROL DEVICE, AND STORAGE MEDIUM

CROSS-REFERENCE TO RELATED APPLICATION(S)

This application claims priority to and the benefit of Japanese Patent Application No. 2021-052004 filed on Mar. 25, 2021, the entire disclosure of which is incorporated herein by reference.

BACKGROUND OF THE INVENTION

Field of the Invention

The present invention relates to a vehicle control device, a vehicle, an operation method for the vehicle control device, and a storage medium.

Description of the Related Art

Japanese Patent Laid-Open No. 2008-305151 discloses, in the case where a right-turning vehicle has started and another vehicle such as a motorcycle is present behind a vehicle oncoming to the right-turning vehicle, performing control to, via a roadside unit, cause the oncoming vehicle to perform headlight flashing. As a result, the right-turning vehicle on an intersection can recognize the presence of the other vehicle traveling straight on the opposite lane.

However, in the technique described in Japanese Patent Laid-Open No. 2008-305151, road equipment such as the roadside unit is required, and notification by headlight flashing cannot be performed at an intersection where no road equipment is installed. In addition, it is not possible to notify the other vehicle such as a motorcycle of the presence of the right-turning vehicle.

The present invention has been made in view of the above problems, and provides a technique for avoiding a collision between vehicles with a simple configuration.

SUMMARY OF THE INVENTION

According to one aspect of the present invention, there is provided a vehicle control device configured to control a self-vehicle, the vehicle control device comprising: a first detection unit configured to detect a direction change of an oncoming vehicle; a second detection unit configured to detect another vehicle on a diagonally rear side of the self-vehicle; and a control unit configured to control a notification unit on the basis of detection results of the first detection unit and the second detection unit, wherein the control unit controls the notification unit to notify the other vehicle of the direction change of the oncoming vehicle in a case where the direction change of the oncoming vehicle has been detected and the other vehicle has been detected.

BRIEF DESCRIPTION OF THE DRAWINGS

FIG. 7 is a flowchart illustrating a procedure of a process performed by a vehicle control device according to a first embodiment;

FIG. 8 is a flowchart illustrating a procedure of a process performed by a vehicle control device according to a second embodiment; and FIG. 9 is a flowchart illustrating a procedure of a process performed by a vehicle control device according to a third embodiment.

DESCRIPTION OF THE EMBODIMENTS

Figure 1:
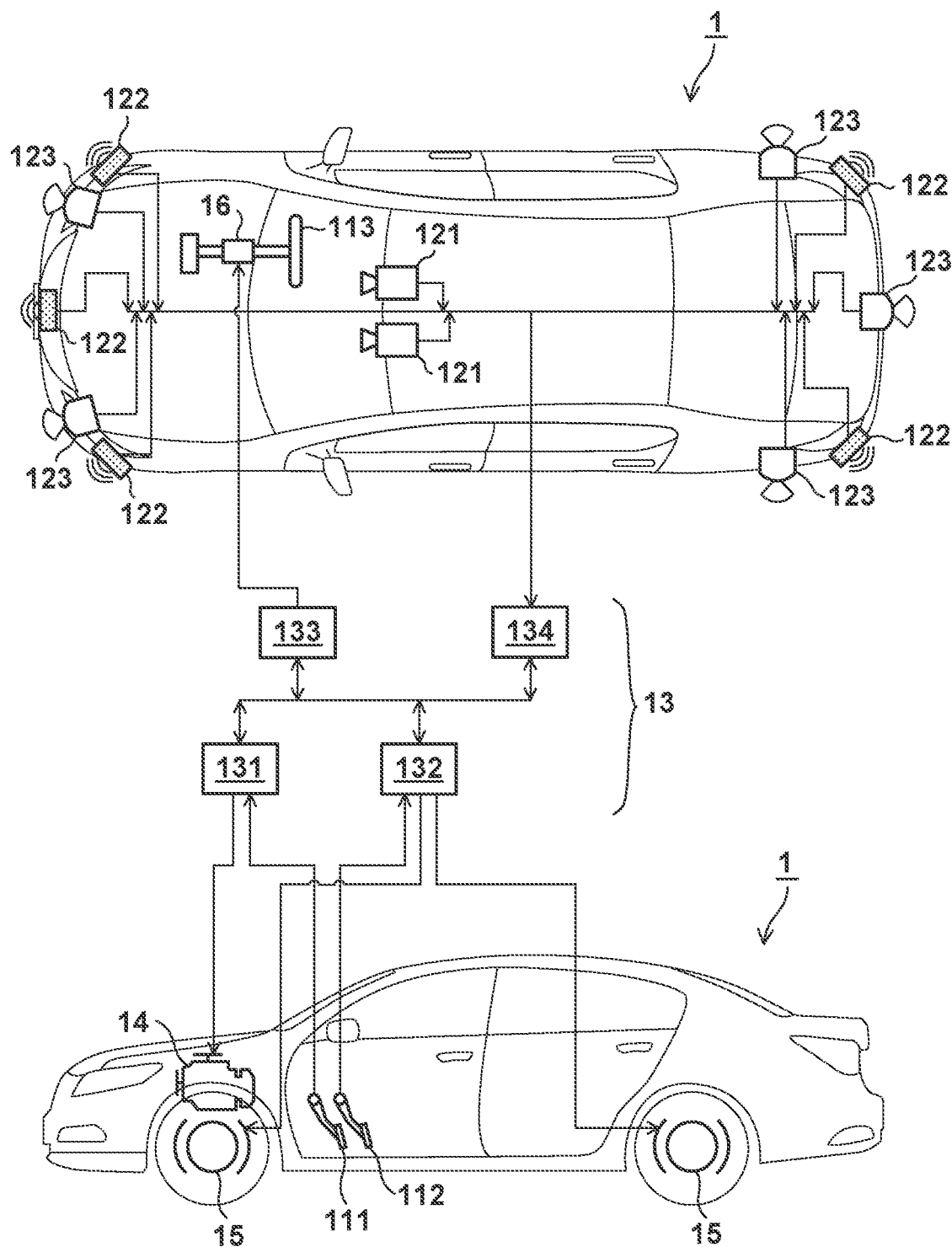
FIG. 1 is a diagram for describing a configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Vehicle Configuration

Figure 2:
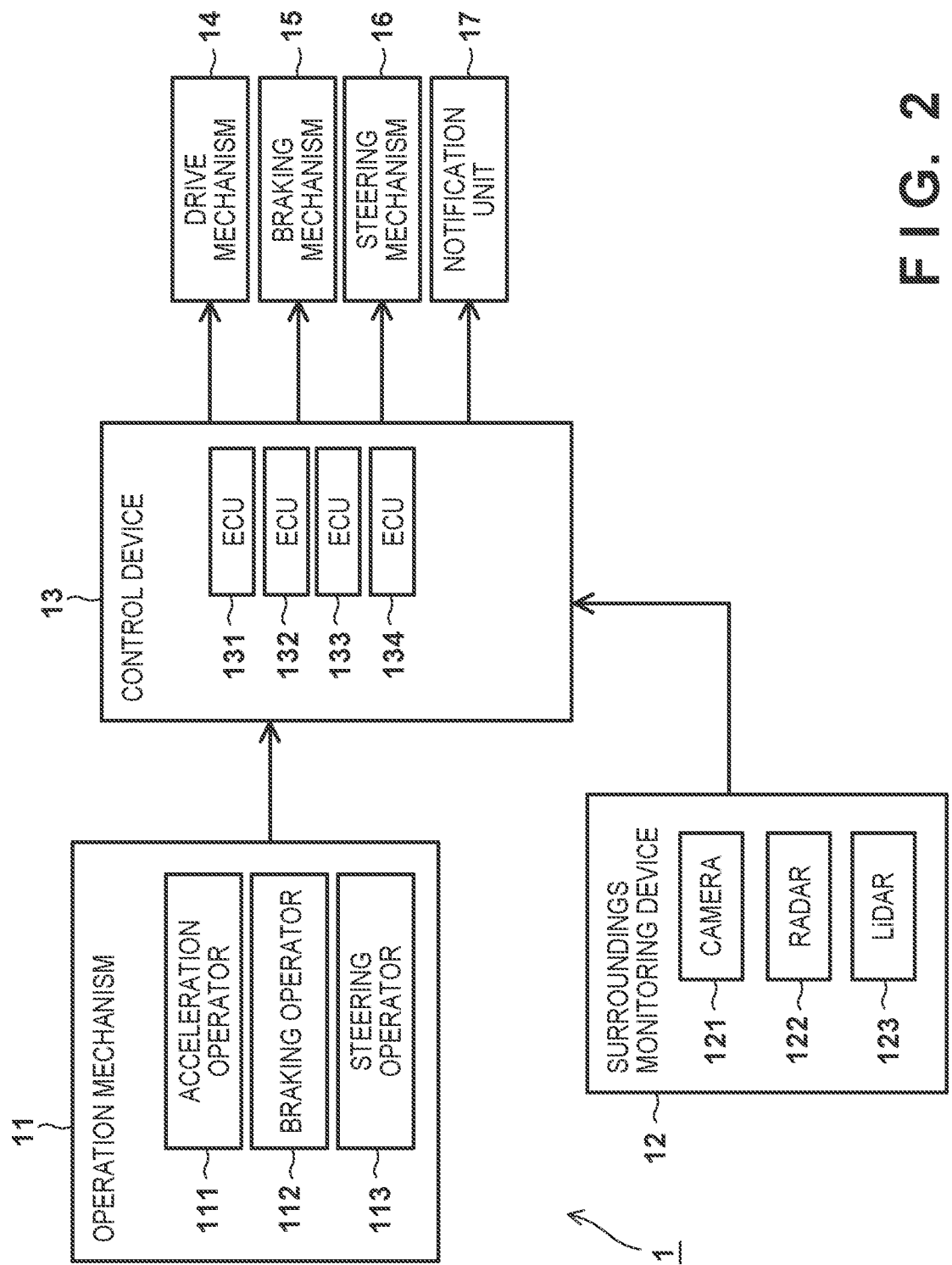
FIG. 2 is a block diagram for describing the configuration example of the vehicle according to the embodiment of the present invention.

FIGS. 1 and 2 are diagrams for describing a configuration of a vehicle 1 according to the present embodiment. FIG. 1 illustrates arrangement positions of elements described below and a connection relationship between elements, by using a top view and a side view of the vehicle 1. FIG. 2 is a system block diagram of the vehicle 1.

In the following description, expressions such as front/back, up/down, and side (left/right) may be used as expressions indicating directions relative to the vehicle body of the vehicle 1. For example, the term "front" indicates the front of the vehicle body in the front-and-rear direction, and the term "upper" indicates the height direction of the vehicle body.

As illustrated in FIG. 2, the vehicle 1 includes an operation mechanism 11, a surroundings monitoring device 12, a control device 13, a drive mechanism 14, a braking mechanism 15, a steering mechanism 16, and a notification unit 17. In the present embodiment, the vehicle 1 is a four-wheeled vehicle, but the number of wheels is not limited thereto.

The operation mechanism 11 includes an acceleration operator 111, a braking operator 112, and a steering operator 113. Typically, the acceleration operator 111 is an accelerator pedal, the braking operator 112 is a brake pedal, and the steering operator 113 is a steering wheel. However, these operators 111 to 113 may be of other types such as a lever type and a button type.

The surroundings monitoring device 12 includes a camera 121, a radar 122, and a light detection and ranging (LiDAR)

123, all of which function as sensors for monitoring or detecting the surrounding environment of the vehicle (self-vehicle) 1. The camera 121 is an imaging device including, for example, a charge-coupled device (CCD) image sensor, a complementary metal oxide semiconductor (CMOS) image sensor, or the like. The radar 122 is, for example, a ranging device such as a millimeter wave radar. The LiDAR 123 is, for example, a ranging device such as a laser radar. As illustrated in FIG. 1, these components are disposed at positions where the surrounding environment of the vehicle 1 can be detected, for example, on the front side, the rear side, the upper side, and the lateral sides of the vehicle body.

Examples of the surrounding environment of the vehicle 1 described above include a travel environment of the vehicle 1 and an environment around the vehicle 1 related thereto (extending direction of lanes, travelable areas, colors of traffic signals, etc.), and object information around the vehicle 1 (presence or absence of objects such as other vehicles, pedestrians, and obstacles, and attributes and positions as well as directions and speeds of movement of the objects, and the like). From this viewpoint, the surroundings monitoring device 12 may be expressed as a detection device or the like for detecting the surrounding information of the vehicle 1.

The control device 13 is configured to be capable of controlling the vehicle 1, and controlling the mechanisms 14 to 16 and the notification unit 17, based on a signal from the operation mechanism 11 and/or the surroundings monitoring device 12, for example. The control device 13 includes a plurality of electronic control units (ECUs) 131 to 134. Each ECU includes one or more central processing units (CPUs), one or more memories, and a communication interface. Each ECU reads one or more programs from one or more memories by one or more CPUs, based on information (data or electric signals) that has been received via the communication interface, and executes a process. Then, its process result is stored in one or more memories, or is output to another element via the communication interface.

The ECU 131 is an acceleration ECU, and controls the drive mechanism 14 described later based on, for example, the amount of operation of the acceleration operator 111 by the driver. The ECU 132 is a braking ECU, and controls the braking mechanism 15 based on, for example, the amount of operation of the braking operator 112 by the driver. The braking mechanism 15 is, for example, a disc brake provided on each wheel. The ECU 133 is a steering ECU, and controls the steering mechanism 16 based on, for example, the amount of operation of the steering operator 113 by the driver. The steering mechanism 16 includes, for example, a power steering.

The ECU 134 is an analysis ECU provided in correspondence with the surroundings monitoring device 12. The ECU 134 is capable of performing a predetermined analysis/process based on the surrounding environment of the vehicle 1 that has been acquired by the surroundings monitoring device 12, and outputting its result to the ECUs 131 to 133. The ECUs 131 to 133 are capable of controlling the mechanisms 14 to 16, based on a signal that has been acquired from the ECU 134. According to such a configuration, the control device 13 is capable of performing travel control of the vehicle 1 in accordance with the surrounding environment.

The ECU 134 also controls the operation of the notification unit 17. The notification unit 17 may be, for example, a display unit such as a light-emitting diode (LED) display, a light source (a daytime running light, a position light, or the like) that can blink or turn on light, or a sound source (a loudspeaker or the like) that can emit sound. Various information is notified to objects such as other vehicles and pedestrians around the vehicle 1 by using display on the display, light, sound, vibration, or the like.

Note that the control device 13 is not limited to the illustrated configuration. For example, semiconductor devices such as application specific integrated circuits (ASICs) may be used for the ECUs 131 to 134. That is, the functions of the ECUs 131 to 134 can be realized by both hardware and software. Some or all of the ECUs 131 to 134 may be configured as a single ECU.

Application Scene

Figure 3:
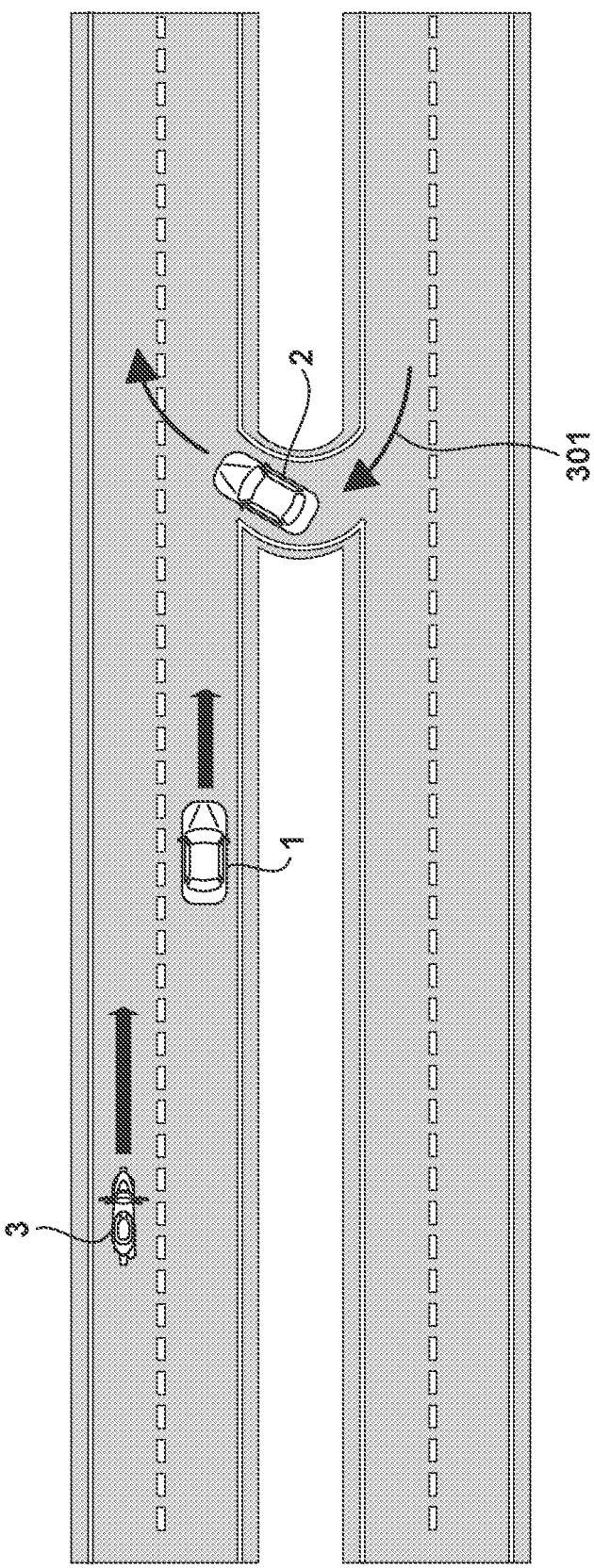
FIG. 3 is a diagram illustrating an application scene of processing of the vehicle control device according to the embodiment of the present invention.

Next, an example of an application scene of the processing according to the present embodiment will be described with reference to FIG. 3. In FIG. 3, the vehicle 1 is traveling in a travel lane. In front of the vehicle 1, an oncoming vehicle 2 is about to change its direction (about to turn in the illustrated example) along an arrow 301. Meanwhile, another vehicle 3 (a two-wheeled vehicle in the illustrated example) is traveling on the diagonally rear side of the vehicle 1. In such a situation, it is difficult for the other vehicle 3 to visually recognize the oncoming vehicle 2 hidden behind the vehicle 1. Similarly, it is difficult for the oncoming vehicle 2 to visually recognize the other vehicle 3 hidden behind the vehicle 1. When the oncoming vehicle 2 changes its direction and enters the travel lane of the other vehicle 3, there is a possibility of collision. In the present embodiment, in such a situation, the vehicle 1 detects the direction change of the oncoming vehicle 2, and notifies the other vehicle 3 traveling on the diagonally rear side of the vehicle 1 of the direction change of the oncoming vehicle 2.

Configuration of ECU 134

Next, a functional configuration of the ECU 134 functioning as a vehicle control device according to the present embodiment will be described with reference to FIG. 4.

The ECU 134 includes a control unit 1340, a direction change detection unit 1341, a diagonally rear side vehicle detection unit 1342, a speed information acquisition unit 1343, and a collision prediction unit 1344. In addition, the notification unit 17 of the vehicle 1 includes a display unit 170.

The direction change detection unit 1341 detects a direction change of the oncoming vehicle 2 on the basis of surroundings information acquired by the surroundings monitoring device 12. For example, the direction of the oncoming vehicle 2 is determined by analyzing a captured image acquired by the surroundings monitoring device 12, and whether or not the direction of the oncoming vehicle 2 is about to be changed is determined. At that time, whether or not the place is a place (for example, a turnaround or an intersection) where a direction change can be executed may be determined by referring to map information held in advance, and the direction of the oncoming vehicle 2 may be determined when it is determined that the place is a place where the direction change can be executed.

The diagonally rear side vehicle detection unit 1342 detects the other vehicle 3 traveling on the diagonally rear side (rear-left side or rear-right side) of the vehicle 1 on the basis of the surroundings information acquired by the surroundings monitoring device 12.

The control unit 1340 controls the notification unit 17 on the basis of the detection result of the direction change detection unit 1341 and the detection result of the diagonally rear side vehicle detection unit 1342. For example, when a direction change of the oncoming vehicle 2 is detected and the other vehicle 3 is detected, the control unit 1340 controls the notification unit 17 to notify the other vehicle 3 of the direction change of the oncoming vehicle 2.

The speed information acquisition unit 1343 calculates and acquires information of the traveling speed of the other vehicle 3 detected by the diagonally rear side vehicle detection unit 1342 based on the surroundings information acquired by surroundings monitoring device 12. For example, a time from when the other vehicle 3 enters the detection area on the diagonally rear side of the vehicle 1 to when the other vehicle 3 leaves the detection area is measured, and thus a relative speed with respect to the vehicle 1 is calculated. Then, the traveling speed of the other vehicle 3 can be calculated using the speed of the vehicle 1. Alternatively, the speed information acquisition unit 1343 may acquire information of the traveling speed of the other vehicle 3 from the other vehicle 3 by inter-vehicle communication. The control unit 1340 can control the notification content by the notification unit 17 on the basis of the information of the traveling speed of the other vehicle 3 acquired by the speed information acquisition unit 1343.

In addition, the speed information acquisition unit 1343 can also calculate the traveling speed of the oncoming vehicle 2 on the basis of the surroundings information acquired by the surroundings monitoring device 12. For example, the traveling speed of the oncoming vehicle 2 can be calculated by calculating the movement amount per unit time of the oncoming vehicle 2 in the captured image acquired by the surroundings monitoring device 12. Similarly, information of the traveling speed of the oncoming vehicle 2 may be acquired from the oncoming vehicle 2 by inter-vehicle communication.

The collision prediction unit 1344 estimates a possibility of collision between the oncoming vehicle 2 and the other vehicle 3, and predicts a time (an estimated time) until the collision. The estimated time here is, for example, a Time-To-Collision (TTC) that is a value obtained by dividing the inter-vehicle distance between the oncoming vehicle 2 and the other vehicle 3 by the relative speed. For example, the control unit 1340 may perform control to perform notification when the estimated time is equal to or less than a first threshold value. Furthermore, the notification unit 17 may be controlled to notify an alarm when the estimated time is equal to or less than a second threshold value smaller than the first threshold value.

Figure 5:
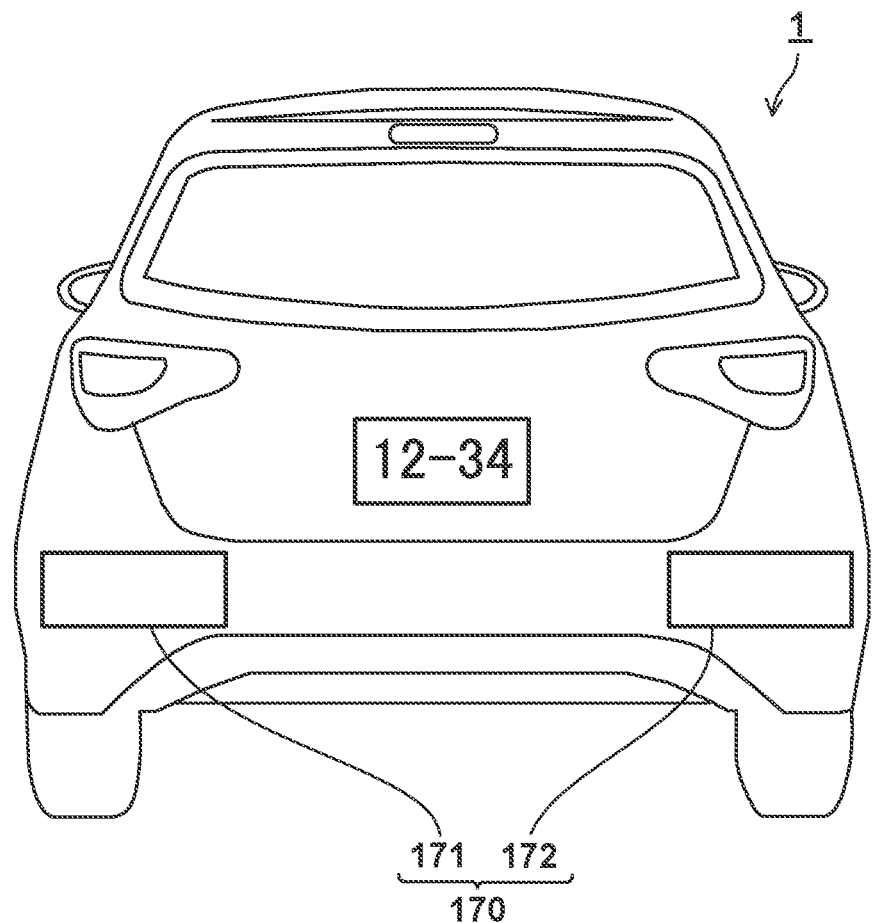
FIG. 5 is a diagram illustrating an example of a display unit disposed in a rear portion of a vehicle according to the embodiment of the present invention.

The notification unit 17 includes, for example, the display unit 170 such as an LED display, and performs notification by display on the display unit 170. Here, an arrangement example of the display unit 170 will be described with reference to FIG. 5. In the illustrated example, the display unit 170 is provided at two positions in the left-right direction of the vehicle width direction of the rear portion of the vehicle. The two display units 170 will be referred to as a first display unit 171 and a second display unit 172. Information can be notified to the other vehicle 3 traveling on the diagonally rear side of the vehicle 1 via the display units 170. The same information may be displayed on the display units both on the left side and the right side. When the other vehicle 3 traveling on the diagonally rear side is traveling in the travel lane on the left side of the vehicle 1, information may be displayed on the display unit 171 disposed on the left side in the vehicle width direction. When the other vehicle 3 is traveling in the travel lane on the right side of the vehicle 1, information may be displayed on the display unit 172 disposed on the right side in the vehicle width direction. Note that the display unit 170 may be disposed, for example, at only one location below a number plate.

Figure 6:
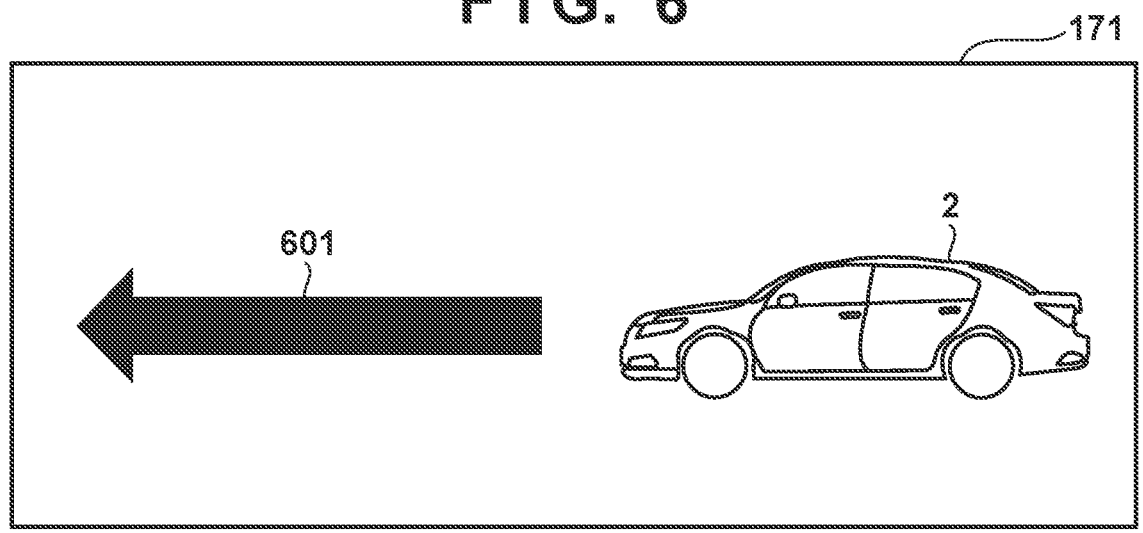
FIG. 6 is a diagram illustrating an example of notification via the display unit according to the embodiment of the present invention.

Here, a notification example according to the present embodiment will be described with reference to FIG. 6. FIG. 6 illustrates a display example of the display unit 171 illustrated in FIG. 5. FIG. 6 illustrates a state in which a display form imitating the oncoming vehicle 2 (for example, an illustration of a four-wheeled vehicle in a side view) is moving from a right end portion toward a left end portion on the display unit 171 along a direction of an arrow 601 (a left direction in the vehicle width direction). As described above, by displaying the state in which the display form imitating the oncoming vehicle 2 moves from the vehicle 1 side (right) to the other vehicle 3 side (left) along the vehicle width direction of the vehicle 1, the driver of the other vehicle 3 can recognize that the oncoming vehicle 2 is present in front of the vehicle 1 and there is a possibility that the oncoming vehicle 2 will enter the travel lane of the other vehicle 3. Furthermore, the notification may be continued by repeating a series of display of the movement from the right end portion to the left end portion. That is, the operation of moving the display form imitating the oncoming vehicle 2 from the right end portion to the left end portion on the display unit 171, then turning off the display, and again moving the display form from the right end portion to the left end portion may be repeated.

Note that the notification unit 17 may be, for example, a light source (a daytime running light, a position light, or the like) that can blink or turn on light, or a sound source such as a loudspeaker that can emit sound. Information may be notified by combining display on a display, light, sound, vibration, and the like.

Figure 4:
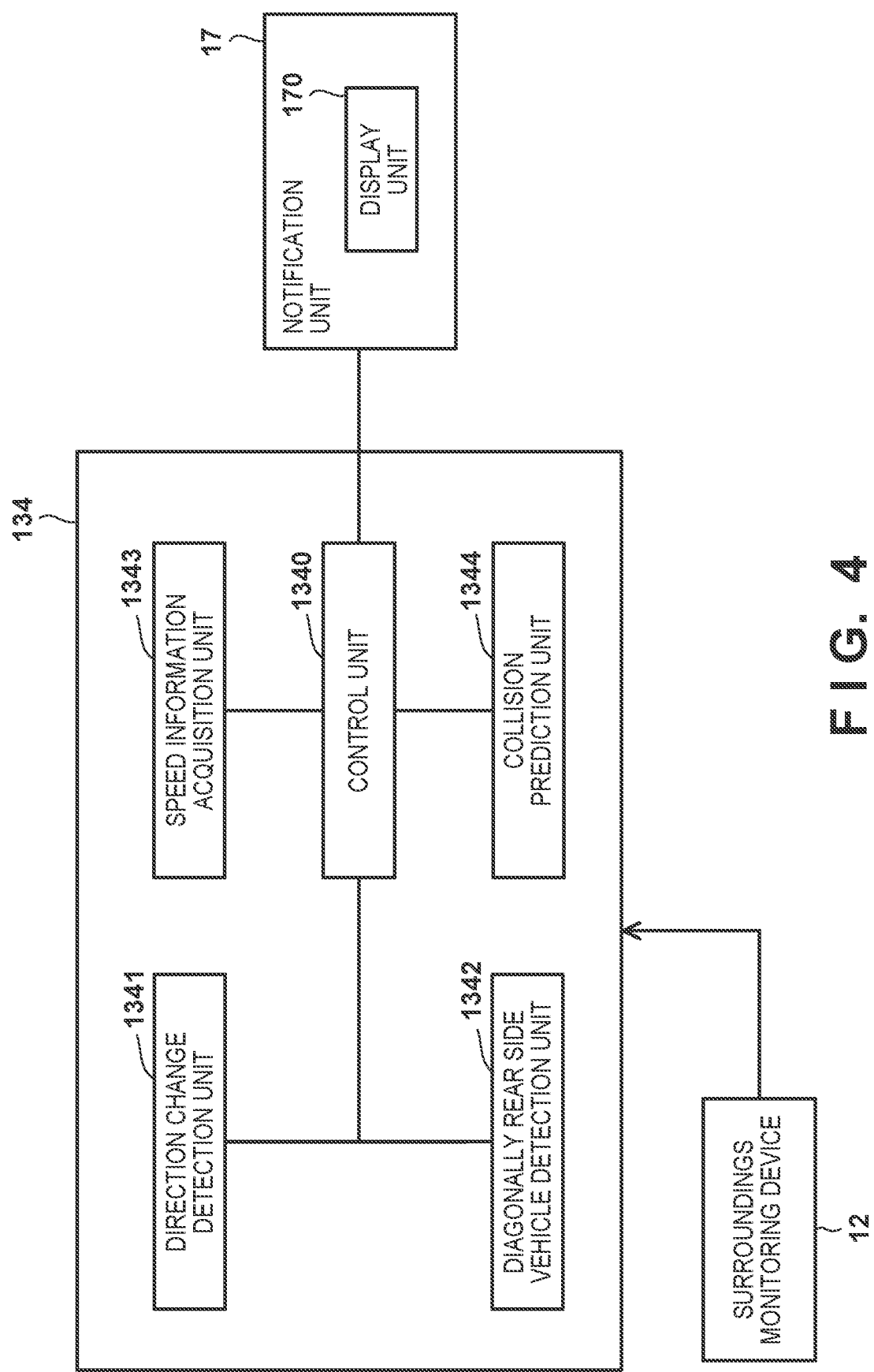
FIG. 4 is a diagram illustrating a configuration example of the vehicle control device according to the embodiment of the present invention.

In addition, the functional configuration of the ECU 134 illustrated in FIG. 4 is merely an example, and a part thereof may be removed from the configuration, or a further element may be added, and the configuration can be a minimum configuration required for realizing the processing of the embodiment.

Processing

FIG. 7 is a flowchart illustrating a procedure of a process performed by the vehicle control device (ECU 134) according to the present embodiment.

In S701, the ECU 134 acquires the surroundings information of the vehicle 1 from the surroundings monitoring device 12.

In S702, the direction change detection unit 1341 detects the oncoming vehicle 2 illustrated in FIG. 3 on the basis of the surroundings information acquired by the surroundings monitoring device 12, and further detects a direction change of the oncoming vehicle 2. When the direction change of the oncoming vehicle 2 is detected, the process proceeds to S703. In contrast, when the direction change of the oncoming vehicle 2 is not detected, the process is ended.

In S703, the diagonally rear side vehicle detection unit 1342 detects the other vehicle 3 traveling on the diagonally rear side (rear-left side in the example of FIG. 3) of the vehicle 1 on the basis of the surroundings information acquired by the surroundings monitoring device 12. When the other vehicle 3 is detected on the diagonally rear side, the process proceeds to S704. In contrast, when the other vehicle 3 is not detected on the diagonally rear side, the process is ended.

In S704, the control unit 1340 controls the notification unit 17 to notify the other vehicle 3 of the direction change of the oncoming vehicle 2. The notification can be performed by display on the display unit 171 as illustrated in FIG. 6. That is, the state in which the display form imitating the oncoming vehicle 2 moves from the vehicle 1 side (right) to the other vehicle 3 side (left) along the vehicle width direction of the vehicle 1 is displayed. Then, a series of display of moving the display form imitating the oncoming vehicle 2 from one end to the other end of the display unit 171 is repeated. Accordingly, the series of processes in FIG. 7 is ended.

As described above, in the present embodiment, when the direction change of the vehicle oncoming to the self-vehicle is detected and the other vehicle traveling on the diagonally rear side of the self-vehicle is detected, the other vehicle is notified of the direction change of the oncoming vehicle.

As a result, a driver of the other vehicle traveling on the diagonally rear side of a certain vehicle can recognize that there is a possibility that an oncoming vehicle changes the direction thereof and enters a travel lane on which the other vehicle is traveling. Therefore, the driver of the other vehicle traveling on the diagonally rear side can drive more carefully by, for example, decelerating intentionally.

Second Embodiment

In the present embodiment, an example will be described in which the contents of the notification are controlled in more detail on the basis of the traveling speed of the other vehicle 3 traveling on the diagonally rear side of the vehicle 1. The device configuration and the application scene of the processing are similar to those in the first embodiment, and therefore the description thereof will be omitted.

Processing

FIG. 8 is a flowchart illustrating a procedure of a process performed by the vehicle control device (ECU 134) according to the present embodiment. Each process of S801 to S803 is similar to each process of S701 to S703 described with reference to FIG. 7, and therefore the description thereof will be omitted.

In step S804, the speed information acquisition unit 1343 calculates and acquires information of the traveling speed of the other vehicle 3 on the diagonally rear side on the basis of the surroundings information acquired by the surroundings monitoring device 12.

In S805, the control unit 1340 controls the notification unit 17 to notify the other vehicle 3 on the diagonally rear side of the vehicle 1 of the direction change of the oncoming vehicle 2 on the basis of the information of the traveling speed acquired in S804. The control unit 1340 performs the notification by performing control to move the display form imitating the oncoming vehicle 2 on the display unit 170 at a movement speed corresponding to the traveling speed of the other vehicle 3. For example, control to move the display form imitating the oncoming vehicle 2 is performed at a higher movement speed when the traveling speed of the other vehicle 3 is higher.

Alternatively, the control unit 1340 may perform control to change the frequency of notification of the direction change of the oncoming vehicle 2 on the basis of the traveling speed of the other vehicle 3. For example, control may be performed such that the direction change of the oncoming vehicle 2 is notified at a higher frequency when the traveling speed of the other vehicle 3 is higher. The frequency can be changed by changing the frequency of repetition of the series of display in which a display form imitating the oncoming vehicle 2 is moved from one end to the other end of the display unit 170 along the vehicle width direction. That is, in the case where the series of display is performed, then the display is turned off, and the series of display is performed again after the elapse of a certain time, the notification frequency can be increased by changing the certain time from a first length to a second length shorter than the first length.

As described above, control is performed such that the intensity of the notification to warn the other vehicle 3 is higher when the traveling speed of the other vehicle 3 is higher. Accordingly, the series of processes in FIG. 8 is ended.

As described above, in the present embodiment, the notification intensity for notifying the other vehicle of the direction change of the oncoming vehicle is changed on the basis of the information of the traveling speed of the other vehicle traveling on the diagonally rear side of the self-vehicle. As a result, it is possible to realize such notification that better warning can be performed according to the traveling speed of the other vehicle traveling on the diagonally rear side of the self-vehicle.

Third Embodiment

In the present embodiment, an example will be described in which a possibility of collision between an oncoming vehicle and another vehicle is estimated, an estimated time until collision is predicted, and notification is controlled on the basis of the estimated time. The device configuration and the application scene of the processing are similar to those in the first embodiment, and therefore the description thereof will be omitted.

Processing

FIG. 9 is a flowchart illustrating a procedure of a process performed by the vehicle control device (ECU 134) according to the present embodiment. The control unit 1340 according to the present embodiment performs control to change notification contents on the basis of the estimated time until collision between the oncoming vehicle 2 and the other vehicle 3. Each process of S901 to S903 is similar to each process of S701 to S703 described with reference to FIG. 7, and therefore the description thereof will be omitted.

In S904, the collision prediction unit 1344 estimates a possibility of collision between the oncoming vehicle 2 and the other vehicle 3, and predicts an estimated time until the collision. For example, a Time-To-Collision (TTC) that is a value obtained by dividing the inter-vehicle distance between the oncoming vehicle 2 and the other vehicle 3 by the relative speed is calculated as the estimated time.

In S905, the control unit 1340 determines whether or not the estimated time calculated in S904 is equal to or less than a first threshold value. When the estimated time is equal to or less than the first threshold value, the process proceeds to S906. In contrast, when the estimated time exceeds the first threshold value, the process returns to S904.

In S906, the control unit 1340 controls the notification unit 17 to notify the other vehicle 3 of the direction change of the oncoming vehicle 2 in a similar manner as S704 of FIG. 7.

At this time, the control unit 1340 may perform control to move the display form imitating the oncoming vehicle 2 on the display unit 170 at a movement speed corresponding to the estimated time that has been calculated. For example, control to move the display form imitating the oncoming vehicle 2 may be performed at a higher movement speed when the estimated time that has been calculated is shorter. Alternatively, the control unit 1340 may change the frequency of notification of the direction change of the oncoming vehicle 2 on the basis of the estimated time that has been calculated. For example, the control unit 1340 may control the frequency of notification of the direction change of the same oncoming vehicle 2 to be higher when the estimated time that has been calculated is shorter. In addition, these may be executed in combination. As a result, notification of higher urgency can be performed the shorter the time is to collision.

In S907, the control unit 1340 determines whether or not the estimated time calculated in S904 is equal to or less than a second threshold value smaller than the first threshold value. When the estimated time is equal to or less than the second threshold value, the process proceeds to S908. In contrast, when the estimated time exceeds the second threshold value, the process returns to S904.

In S908, the control unit 1340 may control the notification unit 17 to notify an alarm indicating that there is a possibility of collision. For example, an alarm is notified by notifying the state of movement of the display form imitating the oncoming vehicle 2 illustrated in FIG. 6 while blinking the display form at a high speed. Alternatively, a text message (for example, a text such as "Please stop immediately.") for notifying that there is a possibility of collision may be displayed on the display unit 170 as an alarm, or an alarm may be output as an alarm sound or an alarm announcement via a sound source such as a loudspeaker. Alternatively, an alarm may be output by blinking or turning on a light such as a daytime running light or a position light disposed at the rear of the vehicle 1. Further, some or all of these may be combined. When the estimated time is short, since the possibility of collision is high, it is possible to encourage collision avoidance by outputting an alarm having a higher intensity than normal notification. Accordingly, the series of processes in FIG. 9 is ended.

As described above, in the present embodiment, a possibility of collision between an oncoming vehicle and another vehicle is estimated, an estimated time until collision is predicted, and notification is controlled on the basis of the estimated time. As a result, it is possible to realize more appropriate notification according to the estimated time until collision.

Modifications

In each of the above-described embodiments, a U-turn has been described as an example of the direction change of the oncoming vehicle as in the application scene illustrated in FIG. 3, but the present invention is not limited to a U-turn. For example, the present invention can also be applied to a situation where an oncoming vehicle is about to turn right at an intersection. Furthermore, the present invention can also be applied to a situation where another vehicle is about to, from a side road, enter the travel lane of the vehicle 1 and the other vehicle 3 traveling on the diagonally rear side thereof.

In addition, some or all of the above-described embodiments may be executed in combination. For example, as in the second embodiment, the notification of the direction change of the oncoming vehicle 2 to the other vehicle 3 on the diagonally rear side may be controlled on the basis of both the traveling speed of the other vehicle 3 on the diagonally rear side and the estimated time until the collision between the oncoming vehicle 2 and the other vehicle 3. For example, notification with a higher urgency may be performed when the traveling speed of the other vehicle 3 is higher and the estimated time to collision is shorter.

In addition, although the vehicle 1 and the other vehicle 3 traveling on the diagonally rear side of the vehicle 1 are traveling in different travel lanes in the example of FIG. 3, the present invention can also be applied to a case where the vehicle 1 and the other vehicle 3 are traveling in the same travel lane (that is, in the case of one lane on each side). This makes it possible to notify the other vehicle 3 of the direction change of the oncoming vehicle 2 in a situation where the other vehicle 3 may pass by the side of the vehicle 1.

OTHER EMBODIMENTS

In addition, a program for achieving one or more functions that have been described in each of the embodiments is supplied to a system or apparatus through a network or a storage medium, and one or more processors in a computer of such a system or apparatus are capable of reading and executing the program. The present invention is also achievable by such an aspect.

The invention is not limited to the foregoing embodiments, and various variations/changes are possible within the spirit of the invention.

Summary of Embodiments

A vehicle control device (for example, 134) according to a first aspect is a vehicle control device configured to control a self-vehicle (for example, 1), and includes:

a first detection unit (for example, 1341) configured to detect a direction change of an oncoming vehicle (for example, 2);

a second detection unit (for example, 1342) configured to detect another vehicle (for example, 3) on a diagonally rear side of the self-vehicle; and a control unit (for example, 1340) configured to control a notification unit (for example, 17) on the basis of detection results of the first detection unit and the second detection unit, in which the control unit controls the notification unit to notify the other vehicle of the direction change of the oncoming vehicle in a case where the direction change of the oncoming vehicle has been detected and the other vehicle has been detected.

As a result, a driver of another vehicle traveling on the diagonally rear side of a certain vehicle can recognize that there is a possibility that an oncoming vehicle changes the direction thereof and enters a travel lane on which the other vehicle is traveling. Therefore, the driver of the other vehicle traveling on the diagonally rear side can drive more carefully by, for example, decelerating intentionally. According to the first aspect, assistance for avoiding a collision between vehicles can be realized with a simple configuration without requiring other road equipment.

In a vehicle control device (for example, 134) according to a second aspect, the notification unit includes a display unit (for example, 170) disposed on an outer rear side of the self-vehicle.

This makes it possible to effectively convey information to the other vehicle traveling on the diagonally rear side via the display unit disposed in the rear portion of the vehicle.

In a vehicle control device (for example, 134) according to a third aspect, the control unit causes the display unit to display a state in which a display form imitating the oncoming vehicle moves from the self-vehicle side to the other vehicle side along a vehicle width direction of the self-vehicle to notify the direction change of the oncoming vehicle.

As a result, the driver of the other vehicle can intuitively recognize that there is a possibility that the oncoming vehicle will change its direction thereto.

In a vehicle control device (for example, 134) according to a fourth aspect, the control unit causes the display unit to repeatedly display the state in which the display form moves to notify the direction change of the oncoming vehicle.

As a result, the driver of the other vehicle can more intuitively recognize that there is a possibility that the oncoming vehicle will change its direction thereto.

In a vehicle control device (for example, 134) according to a fifth aspect, the control unit performs control to move the display form on the display unit at a movement speed corresponding to a speed of the other vehicle.

As a result, it is possible to realize more appropriate notification according to the traveling speed of the other vehicle.

In a vehicle control device (for example, 134) according to a sixth aspect, the control unit performs control to move the display form at a higher movement speed in a case where the speed of the other vehicle is higher.

As a result, in a situation where it is estimated that the traveling speed of the other vehicle is high and the time until collision is short, the intensity of the notification can be increased in order to warn the other vehicle.

In a vehicle control device (for example, 134) according to a seventh aspect, the control unit performs control to change a frequency of notification of the direction change of the oncoming vehicle on the basis of a speed of the other vehicle.

As a result, it is possible to realize more appropriate notification according to the traveling speed of the other vehicle.

In a vehicle control device (for example, 134) according to an eighth aspect, the control unit performs control to notify the direction change of the oncoming vehicle at a higher frequency in a case where the speed of the other vehicle is higher.

As a result, in a situation where it is estimated that the traveling speed of the other vehicle is high and the time until collision is short, the intensity of the notification can be increased in order to warn the other vehicle.

A vehicle control device (for example, 134) according to a ninth aspect further includes a prediction unit (for example, 1344) configured to estimate a possibility of collision between the oncoming vehicle and the other vehicle and predict an estimated time until the collision, in which the control unit performs control to change a notification content on the basis of the estimated time.

As a result, it is possible to realize appropriate notification according to the estimated time until collision.

In a vehicle control device (for example, 134) according to a tenth aspect, the control unit causes the notification unit to make a notification in a case where the estimated time is equal to or less than a first threshold value.

As a result, since the notification is performed only when the estimated time until collision is short, it is possible to reduce inadvertent notification and perform the notification at an appropriate timing.

In a vehicle control device (for example, 134) according to an eleventh aspect, in a case where the estimated time is equal to or less than a second threshold value smaller than the first threshold value, the control unit causes the notification unit to notify an alarm indicating that there is a possibility of collision.

As a result, when the estimated time until the collision is shorter, it is possible to perform not only simple notification but also notification of an alarm, and thus, it is possible to notify the driver of the other vehicle of an alarm with a higher urgency.

In a vehicle control device (for example, 134) according to a twelfth aspect, the control unit performs control to move the display form on the display unit at a movement speed corresponding to the estimated time.

As a result, it is possible to realize more appropriate notification according to the estimated time until collision.

In a vehicle control device (for example, 134) according to a thirteenth aspect, the control unit performs control to move the display form at a higher movement speed in a case where the estimated time is shorter.

As a result, in a situation where it is estimated that the time until collision is short, the intensity of the notification can be increased in order to warn the other vehicle.

In a vehicle control device (for example, 134) according to a fourteenth aspect, the control unit changes a frequency of notification of the direction change of the oncoming vehicle on the basis of the estimated time.

As a result, it is possible to realize more appropriate notification according to the estimated time until collision.

In a vehicle control device (for example, 134) according to a fifteenth aspect, the control unit performs control to notify the direction change of the oncoming vehicle at a higher frequency in a case where the estimated time is shorter.

As a result, in a situation where it is estimated that the time until collision is short, the intensity of the notification can be increased in order to warn the other vehicle.

A vehicle (for example, 1) according to a sixteenth aspect is a vehicle including the vehicle control device according to any one of the first to fifteenth aspects.

Accordingly, the process of the vehicle control device is achievable on the vehicle.

An operation method for a vehicle control device (for example, 134) according to a seventeenth aspect is an operation method for a vehicle control device configured to control a self-vehicle (for example, 1), and includes:

detecting (for example, S702) a direction change of an oncoming vehicle (for example, 2);

detecting (for example, S703) another vehicle (for example, 3) on a diagonally rear side of the self-vehicle; and controlling (for example, S704) a notification unit (for example, 17) on the basis of detection results of the detecting of the direction change and the detecting of the other vehicle, in which in the controlling of the notification unit, the notification unit is controlled to notify the other vehicle of the direction change of the oncoming vehicle in a case where the direction change of the oncoming vehicle has been detected and the other vehicle has been detected.

As a result, a driver of another vehicle traveling on the diagonally rear side of a certain vehicle can recognize that there is a possibility that an oncoming vehicle changes the direction thereof and enters a travel lane on which the other vehicle is traveling. Therefore, the driver of the other vehicle traveling on the diagonally rear side can drive more carefully by, for example, decelerating intentionally. According to the seventeenth aspect, assistance for avoiding a collision between vehicles can be realized with a simple configuration without requiring other road equipment.

A storage medium according to an eighteenth aspect is a non-transitory computer-readable storage medium that stores a program for causing a computer to function as the vehicle control device according to any one of the first to fifteenth aspects.

As a result, the processing of the vehicle control device can be realized by the computer.

According to the present invention, it is possible to avoid collision between vehicles with a simple configuration.

What is claimed is:

1. A vehicle control device configured to control a self-vehicle, the vehicle control device comprising:
one or more memories storing instructions; and
one or more processors executing the instructions to:
detect a direction change of an oncoming vehicle;
detect another vehicle on a diagonally rear side of the self-vehicle; and
control a notification unit on the basis of detection results of the direction change and the other vehicle,
wherein the one or more processors further execute the instructions to control the notification unit to notify the other vehicle of the direction change of the oncoming vehicle in a case where the direction change of the oncoming vehicle has been detected and the other vehicle has been detected,
wherein the notification unit includes a display unit disposed on an outer rear side of the self-vehicle,
the one or more processors further execute the instructions to cause the display unit to display a state in which a display form imitating the oncoming vehicle moves from the self-vehicle side to the other vehicle side along a vehicle width direction of the self-vehicle to notify the direction change of the oncoming vehicle.

2. The vehicle control device according to claim 1, wherein the one or more processors further execute the instructions to cause the display unit to repeatedly display the state in which the display form moves to notify the direction change of the oncoming vehicle.

3. The vehicle control device according to claim 1, wherein the one or more processors further execute the instructions to perform control to move the display form on the display unit at a movement speed corresponding to a speed of the other vehicle.

4. The vehicle control device according to claim 3, wherein the one or more processors further execute the instructions to perform control to move the display form at a higher movement speed in a case where the speed of the other vehicle is higher.

5. The vehicle control device according to claim 1, wherein the one or more processors further execute the instructions to perform control to change a frequency of notification of the direction change of the oncoming vehicle on the basis of a speed of the other vehicle.

6. The vehicle control device according to claim 5, wherein the one or more processors further execute the instructions to perform control to notify the direction change of the oncoming vehicle at a higher frequency in a case where the speed of the other vehicle is higher.

7. The vehicle control device according to claim 1, wherein the one or more processors further execute the instructions to estimate a possibility of collision between the oncoming vehicle and the other vehicle and predict an estimated time until the collision,
wherein the one or more processors further execute the instructions to perform control to change a notification content on the basis of the estimated time.

8. The vehicle control device according to claim 7, wherein the one or more processors further execute the instructions to cause the notification unit to make a notification in a case where the estimated time is equal to or less than a first threshold value.

9. The vehicle control device according to claim 8, wherein in a case where the estimated time is equal to or less than a second threshold value that is smaller than the first threshold value, the one or more processors further execute the instructions to cause the notification unit to notify an alarm indicating that there is a possibility of collision.

10. The vehicle control device according to claim 7, wherein the one or more processors further execute the instructions to perform control to move the display form on the display unit at a movement speed corresponding to the estimated time.

11. The vehicle control device according to claim 10, wherein the one or more processors further execute the instructions to perform control to move the display form at a higher movement speed in a case where the estimated time is shorter.

12. The vehicle control device according to claim 7, wherein the one or more processors further execute the instructions to change a frequency of notification of the direction change of the oncoming vehicle on the basis of the estimated time.

13. The vehicle control device according to claim 12, wherein the one or more processors further execute the instructions to perform control to notify the direction change of the oncoming vehicle at a higher frequency in a case where the estimated time is shorter.

14. A vehicle comprising:
one or more memories storing instructions; and
one or more processors executing the instructions to:
detect a direction change of an oncoming vehicle;
detect another vehicle on a diagonally rear side of the self-vehicle; and
control a notification unit on the basis of detection results of the direction change and the other vehicle,
wherein the one or more processors further execute the instructions to control the notification unit to notify the other vehicle of the direction change of the oncoming vehicle in a case where the direction change of the oncoming vehicle has been detected and the other vehicle has been detected,
wherein the notification unit includes a display unit disposed on an outer rear side of the self-vehicle,
the one or more processors further execute the instructions to cause the display unit to display a state in which a display form imitating the oncoming vehicle moves from the self-vehicle side to the other vehicle side along a vehicle width direction of the self-vehicle to notify the direction change of the oncoming vehicle.

15. An operation method for a vehicle control device configured to control a self-vehicle, the operation method comprising:

detecting a direction change of an oncoming vehicle;
detecting another vehicle on a diagonally rear side of the self-vehicle; and
controlling a notification unit on the basis of detection results of the direction change and the other vehicle,
wherein in the controlling of the notification unit, the notification unit is controlled to notify the other vehicle of the direction change of the oncoming vehicle in a case where the direction change of the oncoming vehicle has been detected and the other vehicle has been detected,
wherein the notification unit includes a display unit disposed on an outer rear side of the self-vehicle, the operation method further comprising:
causing the display unit to display a state in which a display form imitating the oncoming vehicle moves from the self-vehicle side to the other vehicle side along a vehicle width direction of the self-vehicle to notify the direction change of the oncoming vehicle.

16. A non-transitory computer-readable storage medium storing a program for causing a computer to execute an operation method for a vehicle control device configured to control a self-vehicle, the operation method comprising:
detecting a direction change of an oncoming vehicle;
detecting another vehicle on a diagonally rear side of the self-vehicle; and
controlling a notification unit on the basis of detection results of the direction change and the other vehicle,
wherein in the controlling the notification unit, the notification unit is controlled to notify the other vehicle of the direction change of the oncoming vehicle in a case where the direction change of the oncoming vehicle has been detected and the other vehicle has been detected,
wherein the notification unit includes a display unit disposed on an outer rear side of the self-vehicle, the operation method further comprising:
causing the display unit to display a state in which a display form imitating the oncoming vehicle moves from the self-vehicle side to the other vehicle side along a vehicle width direction of the self-vehicle to notify the direction change of the oncoming vehicle.

\* \* \* \* \*